United States Patent [19]

Sears

[11] Patent Number: 5,581,078

[45] Date of Patent: Dec. 3, 1996

[54] BALLISTIC OPTICAL CAMERA TRIGGER

[75] Inventor: Paul A. Sears, Yuma, Ariz.

[73] Assignee: United States of America as represented by the Secretary of the Army, Washington, D.C.

[21] Appl. No.: 462,999

[22] Filed: May 24, 1995

[51] Int. Cl.⁶ .................................................. H01J 40/14
[52] U.S. Cl. .................. 250/214 RC; 250/214.1; 250/214 P; 327/23; 273/362; 356/28; 396/263
[58] Field of Search ......................... 250/214 P, 214.1, 250/214 R, 214 RC, 214 A; 273/362; 354/456; 356/28; 327/3, 23, 25, 27, 515

[56] References Cited

U.S. PATENT DOCUMENTS

| | | | |
|---|---|---|---|
| 3,787,770 | 1/1974 | Cote et al. | 324/178 |
| 4,128,761 | 12/1978 | Oehler. | |
| 4,385,227 | 5/1983 | Bridges | 377/2 |
| 4,418,999 | 12/1983 | Baxter. | |
| 4,535,462 | 8/1985 | Schmidt | 377/2 |
| 4,845,690 | 7/1989 | Oehler. | |

Primary Examiner—Edward P. Westin
Assistant Examiner—Stephen Calogero
Attorney, Agent, or Firm—Freda L. Krosnick; Frank J. Dynda

[57] ABSTRACT

A ballistic optical camera trigger having an integrated circuit capable of converting light to a proportional frequency, wherein the integrated circuit has a fast response time and a wide dynamic range which allows it to sense positive or negative changes in light fast enough to trigger without delay for high speed imaging without computational delays or jitter causing interference. The frequency output of the integrated circuit is tracked by a phase lock loop/voltage controlled oscillator to allow it to follow slow changes in light, but not fast changes in light caused by, for example, a projectile such as a bullet. The frequency output from the integrated circuit is provided to one input of a logic gate which receives at another input thereof, a shaped pulse from the phase lock loop/voltage controlled oscillator circuit, wherein the output of the logic gate is applied to a one-shot for outputting a trigger signal.

20 Claims, 5 Drawing Sheets

BALLISTIC OPTICAL CAMERA TRIGGER

BACKGROUND OF THE INVENTION

This invention relates to a circuit for triggering optical instrumentation and more particularly to a trigger for a ballistic optical camera used in the art of photographing projectiles, such as bullets, wherein the ballistic optical camera trigger has at least one circuit component along the flight path of a projectile for detecting passage of the projectile in order to trigger a camera to take an image of the projectile no matter what the velocity or change in velocity of the projectile.

An existing trigger system known as a "ZERO TIME RADAR" provided by Terma used radar technology similar to the radar used to trigger x-ray units and zero time for ballistic measurements, wherein such similar radar would cause a false triggering of a camera. Further, x-ray "splatter" would also cause a false triggering of the camera down the line of flight of the projectile.

A further triggering method uses an Infra Red (shotgun) trigger which triggers on the flash at the end of a muzzle and delay has to be calculated for intercepting the projectile at the proper point of the camera. Such IR triggers do not work well since obturation of rounds of munitions vary from round to round and creates a very undesirable jitter of the image in the field of view of the camera or loss of data.

Both the "ZERO TIME RADAR" and the IR trigger are analog in nature and light, heat, and RF noise cause false triggers and lost data.

In U.S. Pat. Nos. 4,128,761 and 4,845,690, Kenneth L. Oehler describes ballistic measurement devices known as chronographs wherein a projectile is detected by at least a pair of optical sensors, i.e. "screens" or "skyscreens", for starting and stopping a device for measuring the time the projectile passed from a first of the optical sensors to the second of the optical sensors. Using this measurement and the known distance between the two optical sensors, the velocity of the projectile, at a certain point in the projectiles flight path, can be determined. Errors occurring in these types of devices with these types of optical sensors are generally caused by a faulty sensor. In order to overcome such errors another pair of optical sensors, independent of the first pair, is provided to provide verification of operation of the first pair. However, in the U.S. Pat. No. 4,845,690 device Oehler describes the use of three sensors instead of four to compensate for error due to a faulty one of the sensors. These types of chronograph systems require at least two optical sensors in order to operate properly, and the distance between the sensors must be predetermined.

The *Synchronizing Circuit* described by Barry J. Baxter in U.S. Pat. No. 4,418,999 utilizes two spaced apart magnetic sensors, each of which start a corresponding counter to start counting in a predetermined direction when a projectile is detected by each sensor in order to output a trigger pulse to operate a flash for a camera at a precise point downstream from the sensors and along the flight path of the projectile, irrespective of the speed of the projectile. This circuit, like the chronograph, requires the use of at least two sensors, and the distance from the sensors to the camera must also be known. Accordingly, this circuit involves a delay in activating the flash of the camera due to computational delays.

SUMMARY OF THE INVENTION

Accordingly, an object of the present invention is to trigger optical instrumentation to take an image of a projectile in flight.

It is also an object of the present invention to provide a single optical sensor to detect the passage of a projectile and for triggering a camera to photograph the projectile in response to the detection of the projectile by the optical sensor.

It is a further object of the present invention to provide a ballistic optical camera trigger for activating a ballistic range camera (BRC) to aid in photographing a projectile, such as a bullet, regardless of the velocity of the projectile even under severe heat, dust, moisture, EMF/RF, shock conditions.

It is an alternative object of the present invention to provide multiple optical sensors vertically positioned along the flight path of a projectile so as to provide a greater vertical range for detecting passage of the projectile by one of the optical sensors to trigger a camera to take an image of the projectile.

The present invention comprises an integrated circuit capable of converting light to a proportional frequency, wherein the integrated circuit has a fast response time and a wide dynamic range which allows it to sense positive or negative changes in light fast enough to trigger without delay for high speed imaging without computational delays or jitter causing interference. The frequency output of the integrated circuit is tracked by a phase lock loop/voltage controlled oscillator to allow it to follow slow changes in light, caused by, for example, passing clouds in an outdoor setting, but not fast changes in light, caused by, for example, a projectile such as a bullet. The frequency output from the integrated circuit is provided to one input of a NAND gate which receives at another input thereof, a shaped pulse from the phase lock loop/voltage controlled oscillator circuit, wherein the output of the NAND gate is used to trigger a camera.

The integrated circuit is preferably comprised of a TSL220 light-to-frequency converter which resides in a trigger head in the focus plane of the lens for the ballistic optical camera. The TSL220 converts light received through the optics (focused by surrounding the TSL220 with ground glass on the focus plane) to a proportionate frequency. This is input via a coax cable to a VCO/PLL which emulates that frequency, but is filtered to prevent the VCO from tracking too fast, which is the basis for triggering the camera.

BRIEF DESCRIPTION OF THE DRAWINGS

The above objects and further objects, novel features and other advantages of the present invention will become more apparent by describing the preferred embodiment of the present invention with reference to the attached drawings, in which.

DETAILED DESCRIPTION OF THE INVENTION

Figure 1:
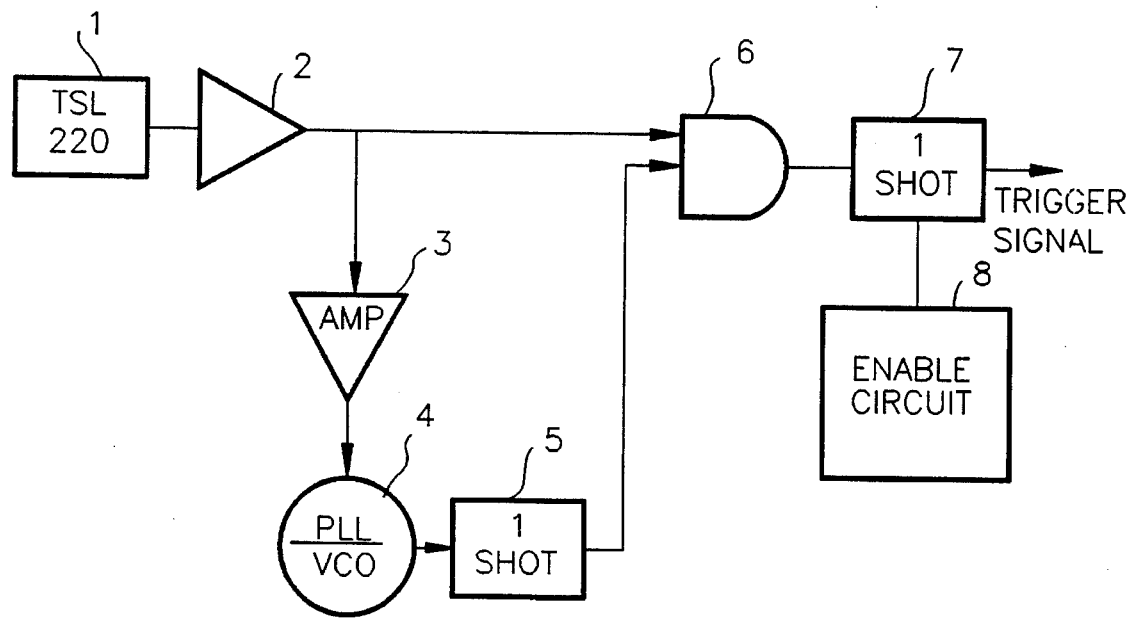
FIG. 1 is a block diagram of a first embodiment in accordance with the present invention.

Referring to FIG. 1, the ballistic optical camera trigger comprises a light-to-frequency converter 1, which is preferably formed by the TSL220 light-to-frequency converter produced by Texas Instruments which has high sensitivity and a wide dynamic range of over 100 dB. Since the output is a frequency signal, dynamic range is not limited by supply voltage and the signal is virtually noise immune and may be transmitted over cables from remote sensors to other parts of the system. The TSL220 light-to-frequency converter resides in a trigger head in the focus plane of a lens and receives light through the optics, e.g. a standard NIKON lens mount having a range of 100 mm to 1000 mm wherein changing of the f stop will ensure lock-up in the phase-lock-loop.

The frequency signal, in the form of pulses, output from the light-to-frequency converter 1 is inverted by an inverter 2, which also functions as a buffer, and is applied to one input terminal of a NAND gate 6 and to an input of a second inverter 3, which also functions as a buffer. The output of inverter 3 is applied to a phase lock loop 4 having a voltage controlled oscillator, a low-pass filter and an inverter (hereafter: PLL/VCO 4).

The PLL/VCO 4 emulates the input frequency from inverter 3, but only for slow or gradual changes in frequency since it has the low-pass filter, such gradual changes being caused by, for example, the passage of clouds. The PLL/VCO 4 cannot keep up with fast changes in input frequency as a result of a passing projectile causing a change in light intensity detected by the light-to-frequency converter 1. This inability of the PLL/VCO 4 to follow the fast changes in input frequency provides the basis for triggering a camera.

Figure 2:
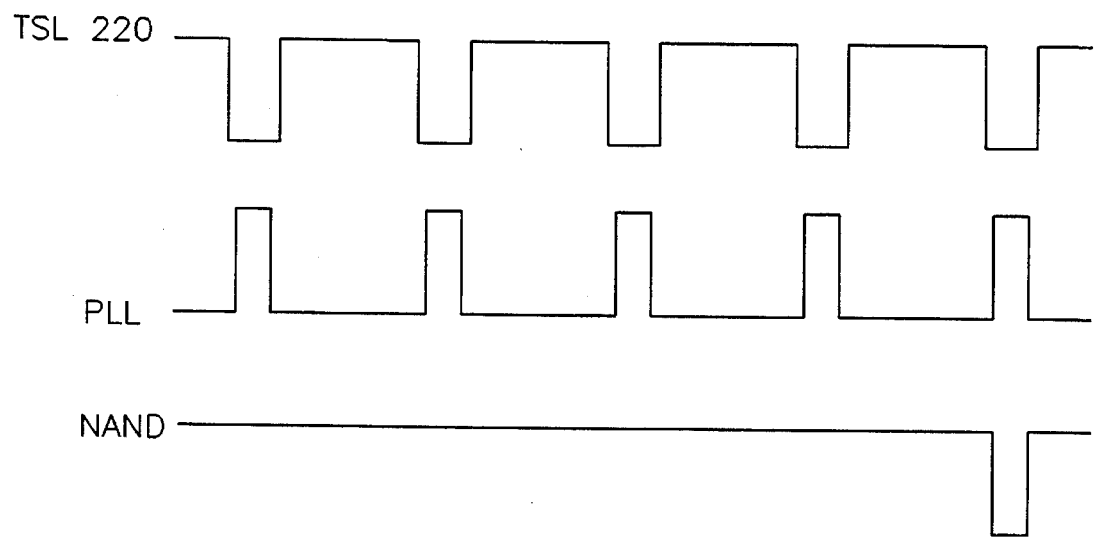
FIG. 2 illustrates waveform outputs of several components of the invention shown in FIG. 1.

The inverted output from the PLL/VCO 4 is applied to a monostable multivibrator, i.e. one-shot, 5 which functions as a pulse shaper. The pulse shaped output is provided to a second input of NAND gate 6. Accordingly, the inverted signal from inverter 2 and the pulse shaped input from one-shot 5 are of different logic values. As shown in FIG. 2, the output of the PLL/VCO 4 is narrower in width than the output of the light-to-frequency converter 1 and occurs between the leading and trailing ends of the pulse output from the light-to-frequency converter 1 while there is phase lock. Phase lock is lost when the light-to-frequency converter 1 detects a passing projectile which changes the output of the NAND gate 6. NAND gate 6 functions as a comparator for comparing the inverted signal from inverter 2 with the pulse shaped signal from one-shot 5.

The output from NAND gate 6 is provided to an inverting input of one-shot 7 which has an enable input provided from enable circuit 8. One-shot 7 must be armed and the enable input must have a closure from −2 to +2 seconds to prevent false triggers. One-shot 7 outputs a trigger signal to a camera (not shown) when light-to-frequency converter 1 detects a passing projectile.

Figure 3:
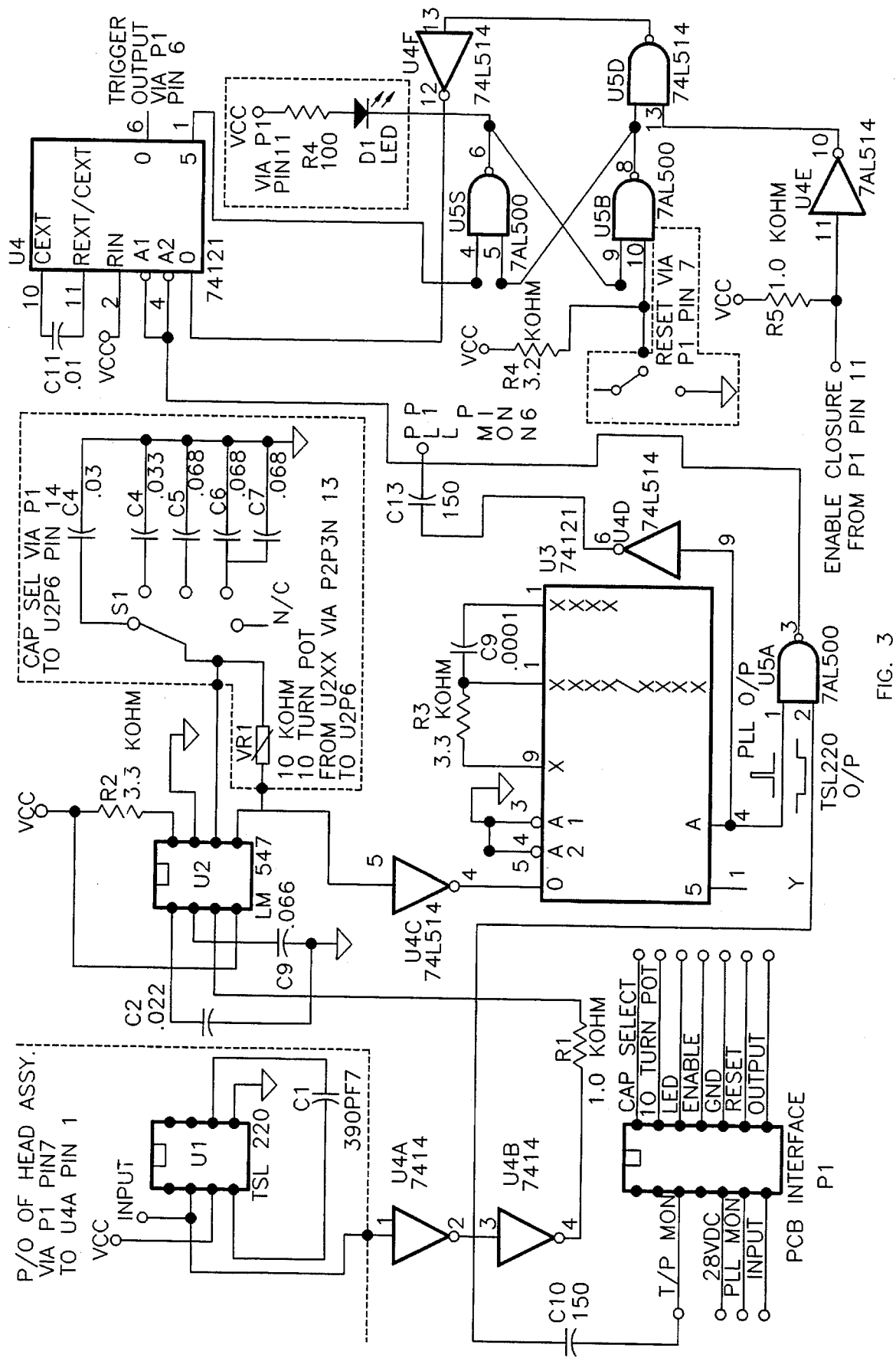
FIG. 3 is a detailed schematic diagram of the first embodiment of the present invention shown in FIG. 1.

The detailed schematic diagram of FIG. 3 shows preferred circuit components for making the present invention according to the first embodiment. Note that PLL/VCO 4 utilizes the XR567 tone decoder by EXAR, but National Semiconductor's tone decoder LM567 may also be used, which is selectively connected to one of a plurality of capacitors and a variable resistor so that the center frequency $F_o$, which is continuously monitored, can be adjusted since the bandwidth is only +/−15% of $F_o$ for this VCO. In the second embodiment, shown in FIG. 4, a broad bandwidth VCO is used which does not require adjustment.

Figure 4:
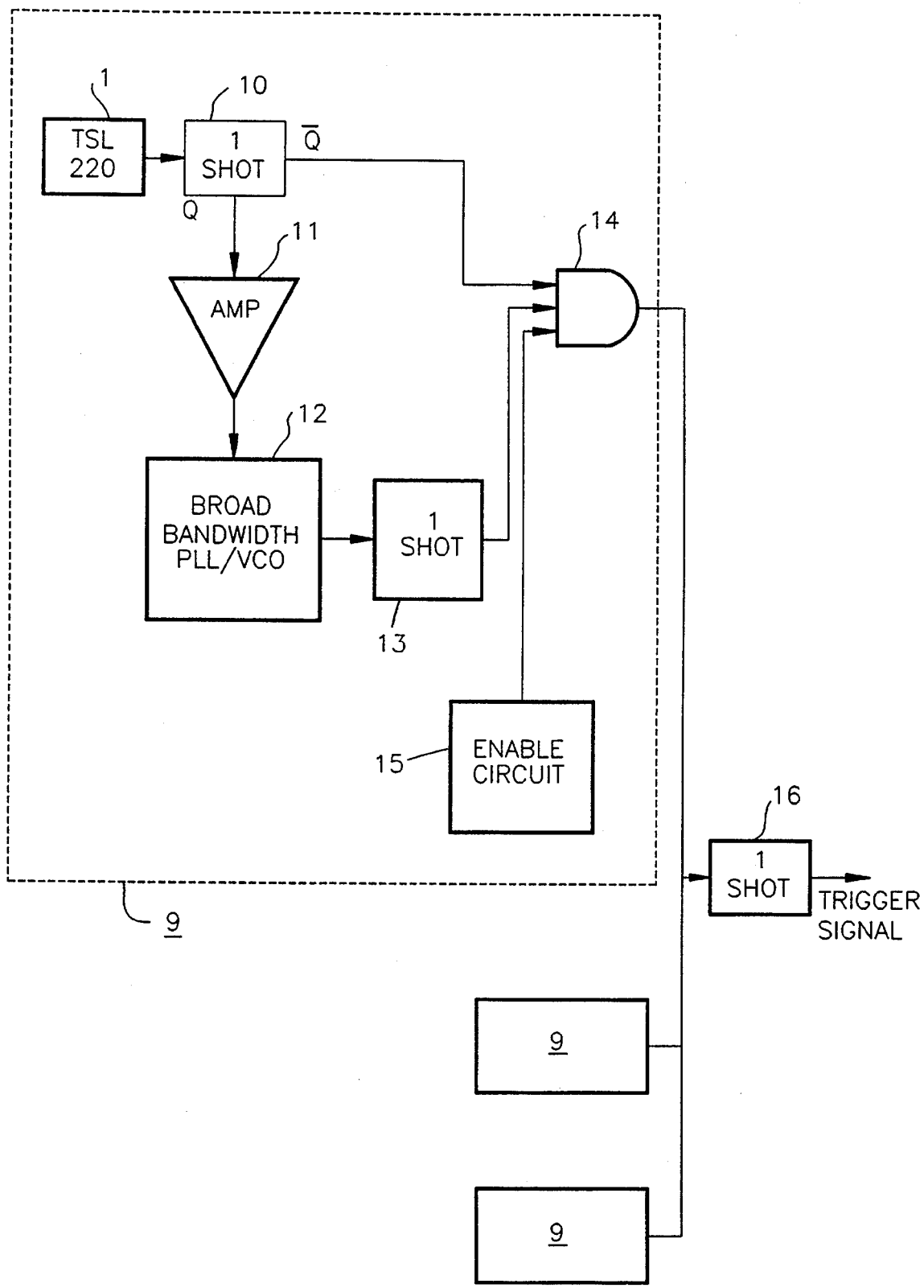
FIG. 4 is a block diagram of a second embodiment in accordance with the present invention.

The second embodiment of the present invention uses three similar circuits illustrated in FIG. 4 by reference numeral 9. In circuit 9 one-shot 10 receives and pulse shapes the frequency signal output from light-to-frequency converter 1. The $\overline{Q}$ output of one-shot 10 is provided to a first input of AND gate 14. The Q output terminal of one-shot 10 is provided to PLL/VCO 12, which comprises a broad bandwidth VCO, via an amplifier 11. The signal output from PLL/VCO 12 is pulse shaped by one-shot 13 and the pulse shaped signal is applied to a second input of AND gate 14. A third input of AND gate 14 is provided by an enable circuit 15 which is responsive to a 28 VDC input for preventing false triggers. The output of AND gate 14 is supplied to the non-inverting input of one-shot 16 which shapes the output of the AND gate to produce the trigger signal to be supplied to a camera (not shown) when light-to-frequency converter 1 detects a passing projectile.

In this second embodiment of the present invention multiple optical sensors formed by light-to-frequency converters 1 are vertically disposed with each other along the intended flight path of a projectile so as to provide a greater vertical range for detecting passage of the projectile by one of the optical sensors to trigger a camera to take an image of the projectile. However, in order to avoid interference due to RF noise the light-to-frequency converters 1 are not placed near each other and the PLL/VCO circuits 12 are also spaced apart from each other.

Figure 5B:
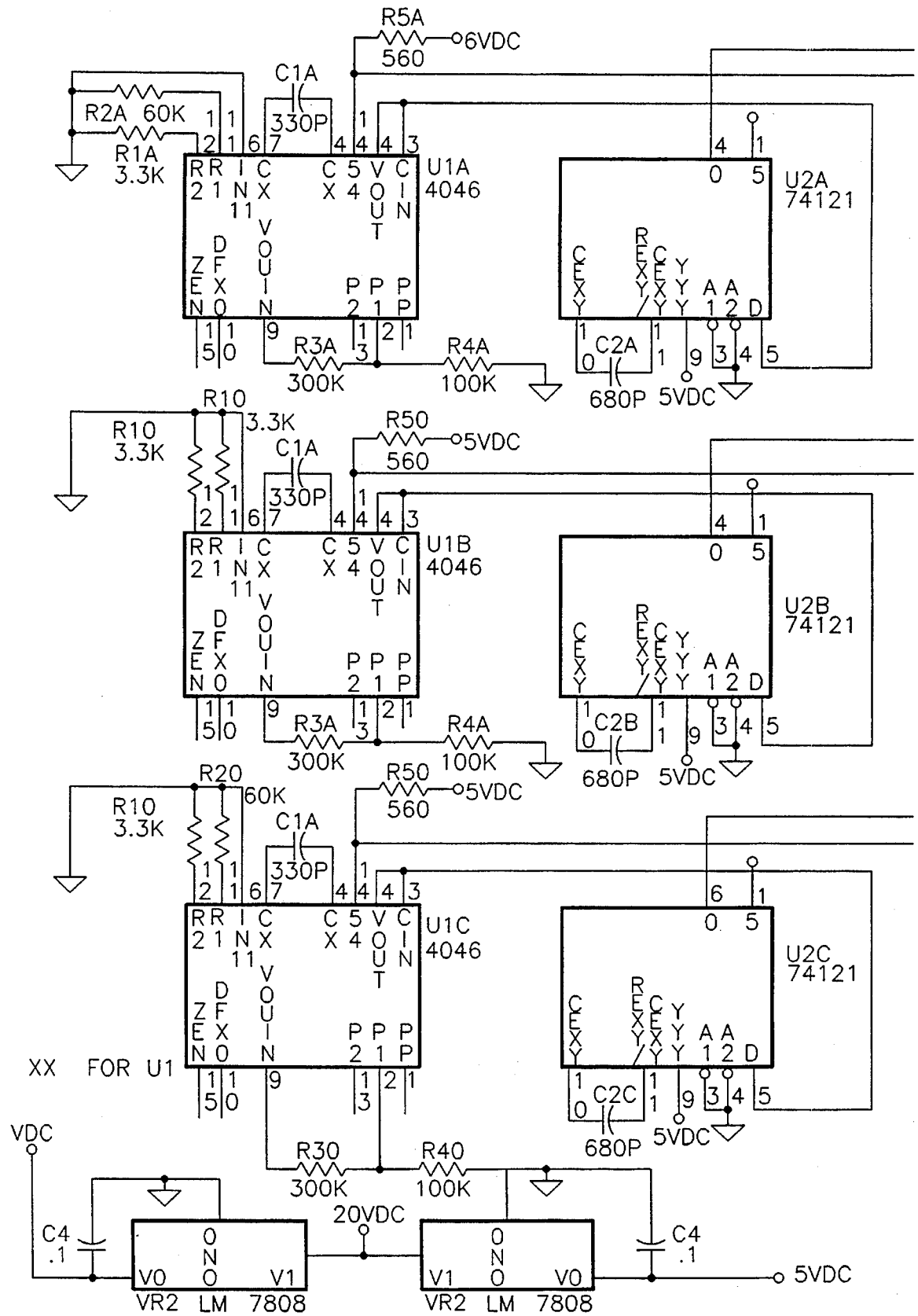
FIG. 5 is a detailed schematic diagram of the second embodiment of the present invention shown in FIG. 3.
Figure 5A:
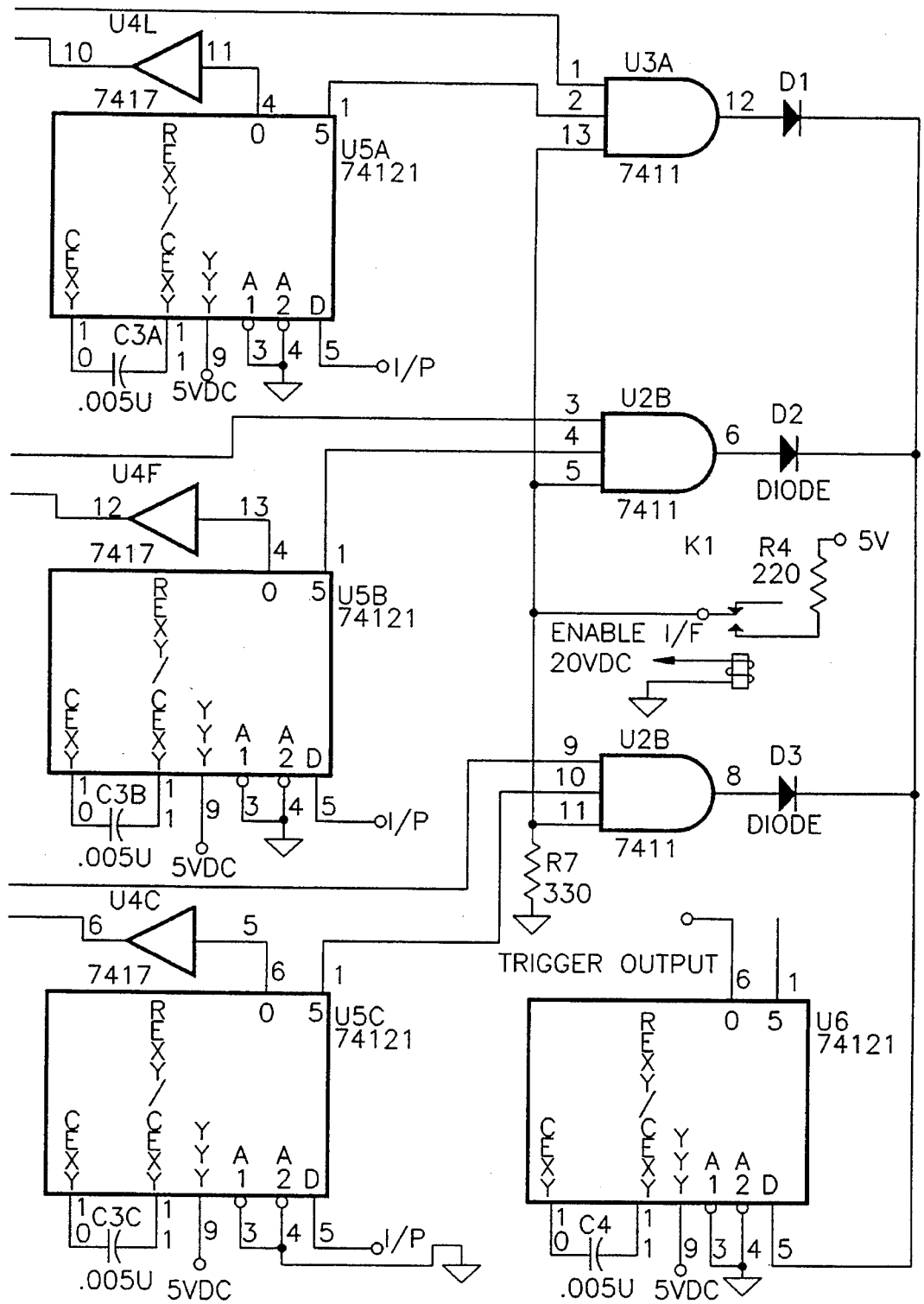

The detailed schematic diagram of FIG. 5 shows preferred circuit components for making the present invention according to the second embodiment. In FIG. 5 the enable circuit 15 is shown to be comprised of a relay responsive to a 28 VDC input for causing a switch to provide 5 VDC to each AND gate 14. Further, as shown in FIG. 5, the PLL/VCO 12 utilizes the MM74HC4046 CMOS phase lock loop integrated circuit produced by National Semiconductor.

While preferred embodiments of the present invention have been particularly shown and described, it will be understood by those skilled in the art that the foregoing other changes in form and details may be made, for example, it should be appreciated by the artisan that an optical filter may be necessary when the device is used outdoors and in full sunlight due to photocurrent limitations of the TSL220, without departing from the spirit and scope of the present invention as defined by the appended claims.

What is claimed is:

1. A ballistic optical camera trigger circuit for generating a trigger signal to be applied to a camera, said ballistic optical camera trigger circuit comprising:

optical means operable for detecting passage of a projectile in a flight path and for generating a first frequency signal and quickly changing said first frequency signal to generate a second frequency signal when said projectile is detected;

means for generating a first inverted signal by inverting said first or second frequency generated by said optical means, and for generating a second inverted signal by inverting said first inverted signal;

phase lock loop means responsive to said second inverted signal for generating one of a first pulse signal and a second pulse signal, said first pulse signal being generated in phase with said first frequency signal when said optical means does not detect said projectile and said second pulse signal being generated out-of-phase with said second frequency signal when said optical means detects said projectile;

trigger signal generating means for comparing said first inverted signal with one of said first pulse signal and second pulse signal generated by said phase lock loop means, said trigger signal generating means providing an output signal having a first logic value when said trigger signal generating means compares said first inverted signal with said first pulse signal, said trigger signal generating means providing said output signal having a second logic value when said trigger signal generating means compares said first inverted signal with said second pulse signal, said output signal having said second logic value being said trigger signal for triggering said camera.

2. The ballistic optical camera trigger circuit as set forth in claim 1, said optical means comprising a light-to-frequency converter.

3. The ballistic optical camera trigger circuit as set forth in claim 1, said first and second inverted signal generating means comprising:

a first inverter for generating said first inverted signal; and a second inverter for generating said second inverted signal.

4. The ballistic optical camera trigger circuit as set forth in claim 1, said phase lock loop means comprises:

a voltage controlled oscillator having an adjustable center frequency; and a plurality of selectable capacitors and a variable resistor for adjusting said center frequency of said voltage controlled oscillator.

5. The ballistic optical camera trigger circuit as set forth in claim 4, said phase lock loop means further comprising:

an inverter for inverting an output signal from said voltage controlled oscillator; and pulse shaping means for providing a shaped pulse signal to said trigger signal generating means in response to the output signal inverted by said inverter.

6. The ballistic optical camera trigger circuit as set forth in claim 5, said pulse shaping means comprising a one-shot having a non-inverting input terminal connected to an output terminal of said inverter.

7. The ballistic optical camera trigger circuit as set forth in claim 1, said trigger signal generating means comprising:

a NAND gate having a first input for receiving said first inverted signal, a second input for receiving one of said first pulse signal or said second pulse signal as a result of whether said optical means detects said projectile, and an output terminal for outputting a comparison result signal; and a one-shot having first and second inverting input terminals for receiving said comparison result signal of said NAND gate and a Q output terminal for providing said output signal having one of said first or second logic values.

8. The ballistic optical camera trigger circuit as set forth in claim 3, said trigger signal generating means comprising:

a NAND gate having a first input for receiving said first inverted signal, a second input for receiving one of said first pulse signal or said second pulse signal as a result of whether said optical means detects said projectile, and an output terminal for outputting a comparison result signal; and a one-shot having first and second inverting input terminals for receiving said comparison result signal of said NAND gate and a Q output terminal for providing said output signal having one of said first or second logic values.

9. The ballistic optical camera trigger circuit as set forth in claim 5, said trigger signal generating means comprising:

a NAND gate having a first input for receiving said first inverted signal, a second input for receiving shaped pulse signal output from said pulse shaping means, and an output terminal for outputting a comparison result signal; and a one-shot having first and second inverting input terminals for receiving said comparison result signal of said NAND gate and a Q output terminal for providing said output signal having one of said first or second logic values.

10. A triggering apparatus having trigger circuit for generating a trigger signal to be applied to a camera, said trigger circuit comprising:

optical sensor means for producing a first frequency signal in response to detected light, and for producing a changed frequency signal in response to a change in said light caused by passage of a projectile between said light and said optical sensor means;

phase lock loop means comprising a voltage controlled oscillator, said phase lock loop means being responsive to said first frequency signal for producing a second frequency signal as an output frequency signal, said second frequency signal being in phase with said first frequency signal;

said phase lock loop means being responsive to said changed frequency signal for producing a third frequency signal as said output frequency signal, said third frequency signal being out of phase with said changed frequency signal;

means for generating an enable signal;

trigger signal generating means being enabled in response to said enable signal, said trigger signal generating means being connected to said optical sensor means and said phase lock loop means, said trigger signal generating means generating trigger signal having a first logic value upon receipt of said first frequency signal from said optical sensor means and said second frequency signal from said phase lock loop means; and said trigger signal generating means generating said trigger signal having a second logic value upon receipt of said changed frequency signal from said optical sensor means and said third frequency signal from said phase lock loop means.

11. The trigger circuit as set forth in claim 10, said optical sensor means comprising a light-to-frequency converter for producing a pulse train having a frequency directly proportional to detected light intensity.

12. The trigger circuit as set forth in claim 11, said optical sensor means further comprising:

a first inverter for producing a first inverted signal in response to said pulse train, said first inverted signal being input to said trigger signal generating means; and a second inverter for producing a second inverted signal in response to said first inverted signal, said second inverted signal being input to said phase lock loop means.

13. The trigger circuit as set forth in claim 11, said optical sensor means further comprising:

a first one shot having a non-inverting input terminal connected to receive said pulse train for providing a shaped pulse train from a Q output terminal and an inverted shaped pulse train from a $\overline{Q}$ output terminal, said inverted shaped pulse train being input to said trigger signal generating means; and an amplifier for driving said shaped pulse train for input to said phase lock loop means.

14. The trigger circuit as set forth in claim 10, said phase lock loop means further comprising a one-shot for pulse shaping said second or third frequency signal for producing pulse shaped second or third frequency signal for input to said trigger signal generating means.

15. The trigger circuit as set forth in claim 12, said phase lock loop means further comprising a first one-shot for pulse shaping said second or third frequency signal for producing pulse shaped second or third frequency signals for input to said trigger signal generating means.

16. The trigger circuit as set forth in claim 13, said phase lock loop means further comprising a second one-shot for pulse shaping said second or third frequency signal for producing pulse shaped second or third frequency signal for input to said trigger signal generating means.

17. The trigger circuit as set forth in claim 15, said trigger signal generating means comprising:

a NAND gate having a first input terminal connected to receive said first inverted signal from said first inverter and a second input terminal connected to receive said pulse shaped second or third frequency signal from said first one-shot, said NAND gate producing a comparison result signal; and a second one-shot being enable by said enable signal and being connected to receive said comparison result signal for producing said trigger signal having one of said first and second logic values based on said comparison result signal.

18. The trigger circuit as set forth in claim 16, said trigger signal generating means comprising:

an AND gate having a first input terminal connected to receive said inverted shaped pulse train from said $\overline{Q}$ output terminal of said first one-shot, a second input terminal connected to receive said pulse shaped second frequency signal or said pulse shaped third frequency signal from said second one-shot, and a third input terminal connected to receive said enable signal, said AND gate producing said trigger signal.

19. A triggering apparatus as set forth in claim 10 comprising a plurality of said trigger circuits.

20. A triggering apparatus as set forth in claim 18 comprising:

a plurality of said trigger circuits, wherein each of said trigger circuits produces a respective trigger signal having one of said first and second logic value; and a third one-shot having a non-inverting input terminal connected to receive the respective trigger signals produced by each of said trigger circuits, said third one-shot providing a pulse shaped trigger signal to the camera in response to at least one of said respective trigger signals.

* * * * *